United States Patent

Fischer et al.

Patent Number: 5,960,003
Date of Patent: Sep. 28, 1999

[54] PROCESS FOR DISTRIBUTING RATE AND POWER IN A MULTICARRIER TRANSMISSION OF A DATA STREAM

[75] Inventors: Robert Fischer, Erlangen; Johannes Huber, Langensendelbach; Werner Henkel, Brachtal, all of Germany

[73] Assignee: Deutsche Telekom AG, Bonn, Germany

[21] Appl. No.: 08/806,579

[22] Filed: Feb. 25, 1997

[30] Foreign Application Priority Data

Feb. 26, 1996 [DE] Germany ............................ 196 07 207

[51] Int. Cl.⁶ ........................................................ H04J 3/16
[52] U.S. Cl. ........................ 370/468; 370/468; 370/343; 370/480; 370/532; 375/257; 375/225
[58] Field of Search ..................................... 370/343, 344, 370/203, 484, 485, 480, 210, 465, 468, 532, 535, 537, 538, 540, 543, 545, 544; 375/257, 258, 260, 225

[56] References Cited

U.S. PATENT DOCUMENTS

| | | | |
|---|---|---|---|
| 5,307,341 | 4/1994 | Yates et al. | 370/18 |
| 5,353,285 | 10/1994 | Van Der Plas et al. | 370/84 |
| 5,483,534 | 1/1996 | Ohki et al. | 370/84 |
| 5,495,483 | 2/1996 | Grube et al. | 370/341 |
| 5,781,728 | 7/1998 | Rybicki et al. | 370/480 |
| 5,822,374 | 10/1998 | Levin | 375/260 |

OTHER PUBLICATIONS

Proakis, J., "Digital Signal Processing Principles, Algorithms, and Applications," Macmillan Publishing Company, New York, 2nd ed., 1992, pp. 804–805.
Bingham, J., "Multicarrier Modulation for Data Transmission: An Idea Whose Time Has Come," IEEE Communications Magazine, May 1990, pp. 5–8, 11–14.
Fredette, P., "The Past, Present, and Future of Inverse Multiplexing," IEEE Communications Magazine, Apr. 1994, pp. 42–46.
John G. Proakis; Dimitris G. Manolakis, "Digital Signal Processing Principles, Algorithms, and Applications", pp. 804, 805, Copyright 1992.
John A. C. Bingham, "Multicarrier Modulation for Data Transmission: An Idea Whose Time Has Come", IEE Communications Magazine, pp. 5–14, May 1990.
Paul H. Fredette, "The Past, Present, and Future of Inverse Multiplexing", IEEE Communications Magazine, pp. 42–46, Apr. 1994.
Peter S. Chow et al., A Practical Discrete Multitone Transceiver Loading Algorithm for Data Transmission over Spectrally Shaped Channels, IEEE Transactions on Communications, pp. 773–775, vol. No. 2/3/4, 1995.

Primary Examiner—Jeffery A. Hofsass
Assistant Examiner—Daniel Previl
Attorney, Agent, or Firm—Kenyon & Kenyon

[57] ABSTRACT

A process for distributing an aggregate rate and total transmitting power of a data stream over a plurality of channels in which the sub-rate ($R_i$), capable of being transmitted over one channel, is calculated for each selected channel in accordance with the equation $$R_i = \frac{R_T}{D'} + \frac{1}{D'} ld\left(\frac{\prod_{l=1}^{D'} N_l}{N_i^{D'}}\right) \quad (1)$$

$R_i$ being the sub-rate in the i-th channel, $N_i$ the average noise power first determined in the i-th channel, and D' being the number of actually used channels out of the channel group.

7 Claims, 3 Drawing Sheets

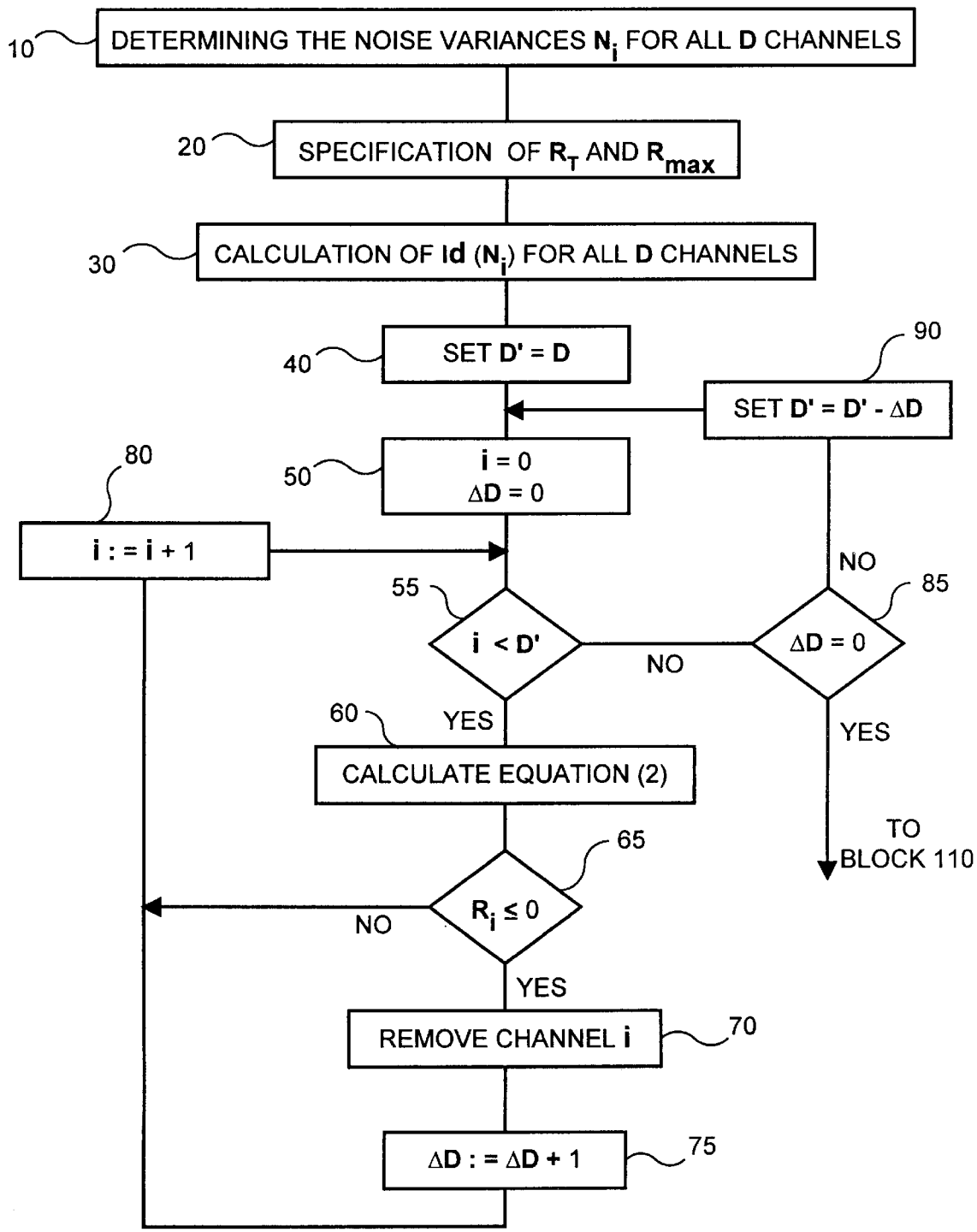
F I G. 1A

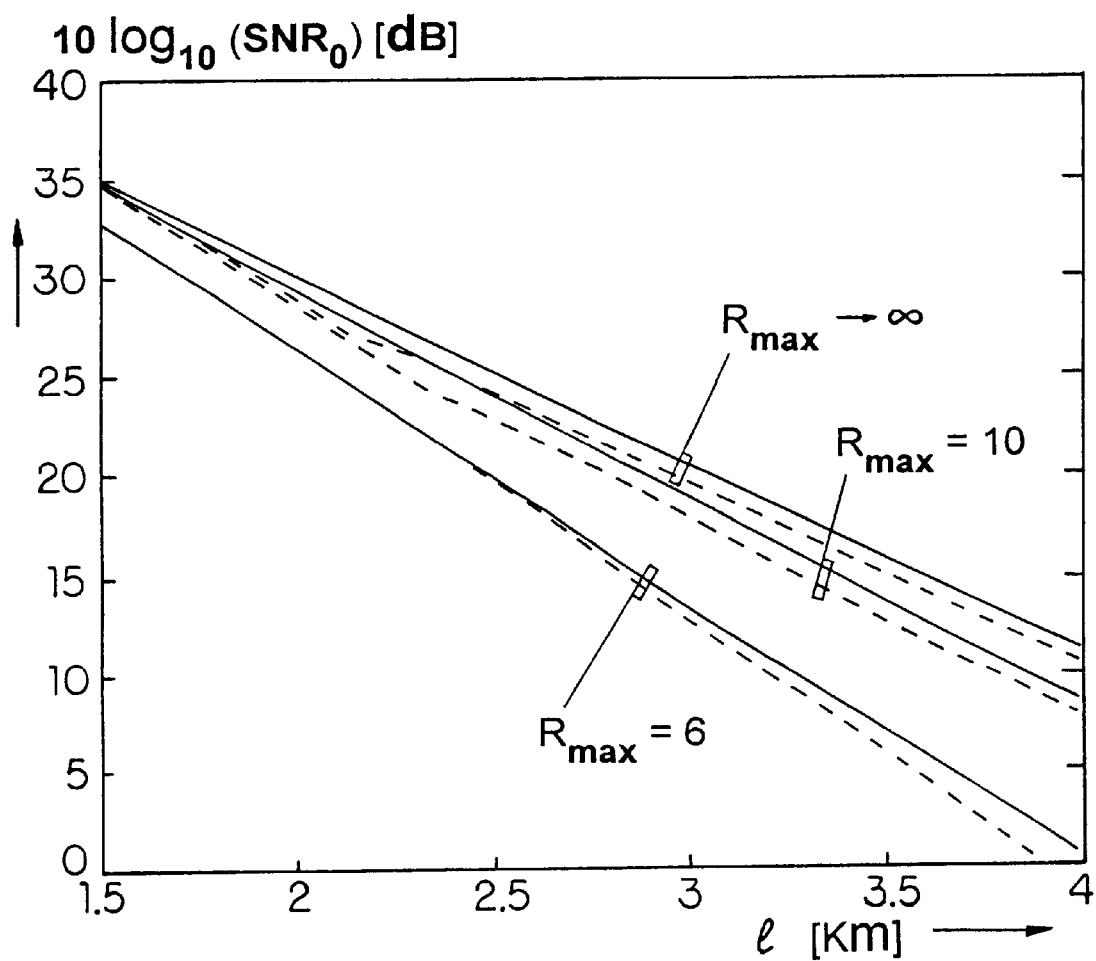
F I G. 2

PROCESS FOR DISTRIBUTING RATE AND POWER IN A MULTICARRIER TRANSMISSION OF A DATA STREAM

FIELD OF THE INVENTION

The invention relates to a process for distributing the aggregate rate of the total power of a data stream over a plurality of channels of a channel group.

RELATED TECHNOLOGY

Systems are known from the field of digital signal processing which render possible high-rate digital telecommunications. Multicarrier transmission, also known as "discrete multitone" (DMT), is a technique that is gaining in significance today. In multicarrier transmission, the data stream to be transmitted is separated into a plurality of parallel sub-streams which can be transmitted independently of one another, for example, in a frequency-division multiplex operation. Therefore, it is characteristic of multicarrier transmission, which makes use of the frequency-multiplexing technique, to divide the useful frequency band into a plurality of narrow-band channels, which can be used individually. Another method for transmitting the separated, parallel sub-streams or sub-rates of a data stream comprises using, for example, parallel routed physical connections, such as glass fiber, copper lines or radio links. The fundamental concept underlying multicarrier transmission comprises transmitting the individual sub-streams over those channels which are subject to the least amount of noise interference. The channels experiencing less noise interference are assigned a higher data rate than those experiencing heavier interference. The sub-rate can be adapted to the transmission quality of a particular channel by varying the size of the signal constellations used, for example, by using different-size constellations of a quadrature amplitude modulation (QAM). The fundamental problem encountered in every telecommunication is to transmit the information as reliably as possible to a receiver. In other words, the bit error probability of each channel used to transmit the sub-streams should be minimal.

In the article "Multicarrier Modulation for Data Transmission: An Idea Whose Time Has Come", published in IEEE Communications Magazine, pp. 5–14, 1990, J. A. C. Bingham describes the "Hughes-Hartogs algorithm", which enables the rate and performance of the data stream to be distributed over selected channels. In a first step, the average noise power in the individual channels is estimated. After that, that transmitting power is determined for each channel which is necessary to transmit a rate of R bits/symbol, given a defined error probability. The binary symbols of a specified symbol supply are then successively distributed over the selected channels, until the target bit rate $R_T$ is reached. To transmit the sub-rates of a data stream, those channels which require the least additional power are selected to transmit an additional binary symbol in order to produce a desired noise immunity. A distinguishing feature of the known Hughes-Hartogs algorithm is that the transmitting power can be efficiently assigned to each selected channel. However, its drawback is that a considerable extent of computation is required to search for the suitable channels, as well as to calculate the partial transmitting power for each channel. This algorithm seems especially unsuited for high-rate, digital communication systems, since a rapid and efficient hardware implementation is not possible at the present time.

In the article, "A Practical Discrete Multitone Transceiver Loading Algorithm for Data Transmission over Spectrally Shaped Channels", published in IEEE Transactions on Communications, 43: pp. 773–775, February/March/April 1995, P. S. Chow, J. M. Cioffi and J. A. C. Bingam disclose an algorithm which circumvents the costly and computationally intensive search for suitable channels for transmitting sub-rates of a data stream. This is accomplished by a known algorithm in that the sub-rates to be transmitted for the individual channels are distributed based on an optimal utilization of the channel capacity. As a sub-rate $R_i$ in the i-th channel, the known algorithm selects $$R_i = \log_2(1 + S_i/(N_i * \Gamma)),$$

$S_i$ denoting the average transmitting power in the i-th channel, which is initially identical for all selected channels, $N_i$ denoting the average noise power in the i-th channel, and $\Gamma$ being a positive parameter which is adjusted iteratively until the aggregate rate $\Sigma_i R_i$ equals the desired target bit rate $R_T$. The sub-rates are rounded to integer values. In a further step, the total transmitting power is distributed over the selected channels so that all channels have the same error rate. The effects of the rate quantization, which occur when the previously calculated rates $R_i$ are rounded to integer values, are compensated through adaptation of the partial transmitting powers. The inherent drawback of this method is that the rates are distributed over the individual channels on the basis of the channel capacity. This is a drawback because often, when a digital transmission system is developed, the goal is not the optimal utilization of the channel capacity, but rather, along with a constant overall transmitting capacity, to transmit a defined, fixed rate, which is to be optimally distributed among a plurality of selected channels. Moreover, the rates and transmitting powers are dependent from one another, so that there is no possibility for further optimization.

SUMMARY OF THE INVENTION

An object of the present invention is to make available a process which will enable the total power and the aggregate rate of a data stream to be transmitted to be optimally distributed over selected channels and, at the same time, the computational work required for a suitable hardware realization to be substantially reduced.

The present invention therefore provides a process for distributing the aggregate rate ($R_T$) and the total transmitting power ($S_T$) of a data stream over a plurality of channels (D') of a channel group of a predefined size (D), characterized by the following process steps:

a) the average noise power ($N_i$) in each channel is determined;

b) the sub-rate ($R_i$) capable of being transmitted over one channel, is calculated in accordance with the equation $$R_i = \frac{R_T}{D'} + \frac{1}{D'} ld\left(\frac{\prod_{i=1}^{D'} N_i}{N_i^{D'}}\right) \tag{1}$$

$R_i$ being the sub-rate in the i-th channel, $N_i$ the average noise power in the i-th channel, and D' the number of channels used of one channel group;

c) all those channels, whose sub-rates calculated in step b) are less than or equal to zero, are no longer considered;

d) the sub-rates of the channels remaining in step c) are rounded to integer values ($R_{iq}$) in such a way that $\Sigma R_{iq} = R_T$;

e) the total transmitting power $S_T$ is distributed over all channels remaining in step c) so as to effect the automatic adjustment of the same bit error rate in each channel.

Advantageously, the steps b) and c) in the above process are repeated iteratively until all sub-rates are positive, with the number D' of channels used initially being set to D and reduced in each subsequent iteration step by the number of channels, whose sub-rates, which are calculated in step c) of the preceding iteration step, are less than or equal to zero. In addition, step d) advantageously comprises the following steps:

d1) each positive sub-rate is rounded up or rounded off to an integer value ($R_{iq}$) and the corresponding difference $\Delta R_i = R_i - R_{iq}$ is determined and stored;

d2) all the rounded sub-rates ($\Sigma R_{iq}$) are then summed;

d3.1) when $\Sigma R_{iq} > R_T$, the sub-rate of the channel, for which $\Delta R_i$ is minimal, is decremented;

d3.2) step d3.1) is repeated until the aggregate rate $R_T$ is reached;

d4.1) when $\Sigma R_{iq} < R_T$, the sub-rate of the channel for which $\Delta R_i$ is maximum is incremented;

d4.2) step d4.1) is repeated until the aggregate rate $R_T$ is reached.

Moreover, the equation indicated in step b) may be rewritten $$R_i = \frac{R_T + \sum_{l=1}^{D'} ld(N_l)}{D'} - ld(N_i) \quad (2)$$

and to implement step b), the logarithm of the average noise power is first calculated for each channel and stored with a definite assignment. Also, advantageously the sub-rates calculated in step b), which are greater than a predefined maximum sub-rate ($R_{max}$), are set to this maximum value.

The basic thought behind the present invention is to distribute the aggregate rate and the total transmitting power of a data stream to be transmitted over selected channels in a way which will enable the data stream to be transmitted with a minimal bit error probability. This is achieved in that the symbol error rate is minimized, or that the minimal quadratic Euclidean distance (relative to the average noise power between two signal points of a defined signal constellation, which can be represented, for example, in a QAM (quadrature amplitude modulation) diagram, is maximized in the receiver. If the noise variances, which can also be described as average noise powers, of all channels and the total transmitting power needed to transmit the data stream are known, the sub-rate to be transmitted via the i-th channel can be calculated. For this purpose, the signal-to-noise ratio, which is defined by the quotient resulting from the minimal quadratic distance of a signal point from the decision threshold and the average noise power in the i-th channel, must be maximized. Accordingly, the sub-rate $R_i$ capable of being transmitted over the i-th channel, can be calculated in accordance with the equation $$R_i = \frac{R_T}{D'} + \frac{1}{D'} ld\left(\frac{\prod_{l=1}^{D'} N_l}{N_i^{D'}}\right) \quad (1)$$

$R_i$ being the sub-rate in the i-th channel, $N_i$ the average noise power in the i-th channel, and D' the number of channels used of one channel group of a defined size, and with "ld" denoting logarithmus dualis or $\log_2$ and $\pi$ representing the product (here of all the $N_l$'s from l=1 to D'), which is then divided by $N_i$ raised to the D' power. In calculating the sub-rates, all those channels whose previously calculated sub-rates are less than or equal to zero, are eliminated for the further process. After that, the sub-rates of the remaining channels are rounded to integer values $R_{iq}$ in such a way that $\Sigma R_{iq} = R_T$. Finally, the total transmitting power $S_T$ is distributed over all remaining channels so as to effect the automatic adjustment of the same bit error rate in each channel.

The distribution of the aggregate rate and of the total transmitting power over selected channels can be further optimized by iteratively repeating equation (1) to calculate the sub-rates until all sub-rates are positive. The number D' of channels used is initially set to D, i.e., the total number of channels belonging to the channel group, and is reduced in each subsequent iteration step by the number of channels whose sub-rates, which were calculated in the preceding iteration step, are less than or equal to zero.

The positive sub-rates are expediently rounded in that each positive sub-rate is rounded up or rounded off to an integer value $R_{iq}$ and the corresponding difference $\Delta R_i = R_i - R_{iq}$ is determined and stored. All the rounded sub-rates are then summed, and a test is performed to check whether the sum is greater than the aggregate rate $R_T$. If the sum is greater, the sub-rate of the channel for which $\Delta R_i$ is minimal, is decremented. This step is repeated until the aggregate rate $R_T$ is reached. However, if the sum of all rounded sub-rates is smaller than the aggregate rate $R_T$, then the sub-rate of the channel for which $\Delta R_i$ is maximum is incremented. This step is repeated, in turn, until the aggregate rate $R_T$ is reached.

To further reduce the computational burden, before calculating the sub-rates $R_i$, the logarithm of the average noise power is first calculated for each channel (i.e., each ld $N_i$ is calculated) and stored with a definite assignment. It is then merely necessary in this case to perform simple addition and division steps using a suitable hardware implementation. For this purpose, equation (1) may be rewritten as:

$$R_i = \frac{R_T + \sum_{l=1}^{D'} ld(N_l)}{D'} - ld(N_i) \quad (2)$$

For practical considerations, the sub-rate to be transmitted over a channel is limited to a maximum value $R_{max}$. The maximum sub-rate can amount, for example, to 10 bits/symbol. Each calculated sub-rate, which is greater than this maximum value, is set to this maximum sub-rate.

BRIEF DESCRIPTION OF THE DRAWINGS

The invention is elucidated in the following on the basis of an exemplary embodiment in conjunction with the enclosed drawings, of which:

FIGS. 1A and 1B show the flow chart of the process according to the invention; and FIG. 2 shows a diagram, in which the signal-to-noise ratios over the cable length having the maximum sub-rate are plotted as parameters in accordance with the process of the invention in comparison to the known Chow et al. process.

DETAILED DESCRIPTION

Figure 1B:
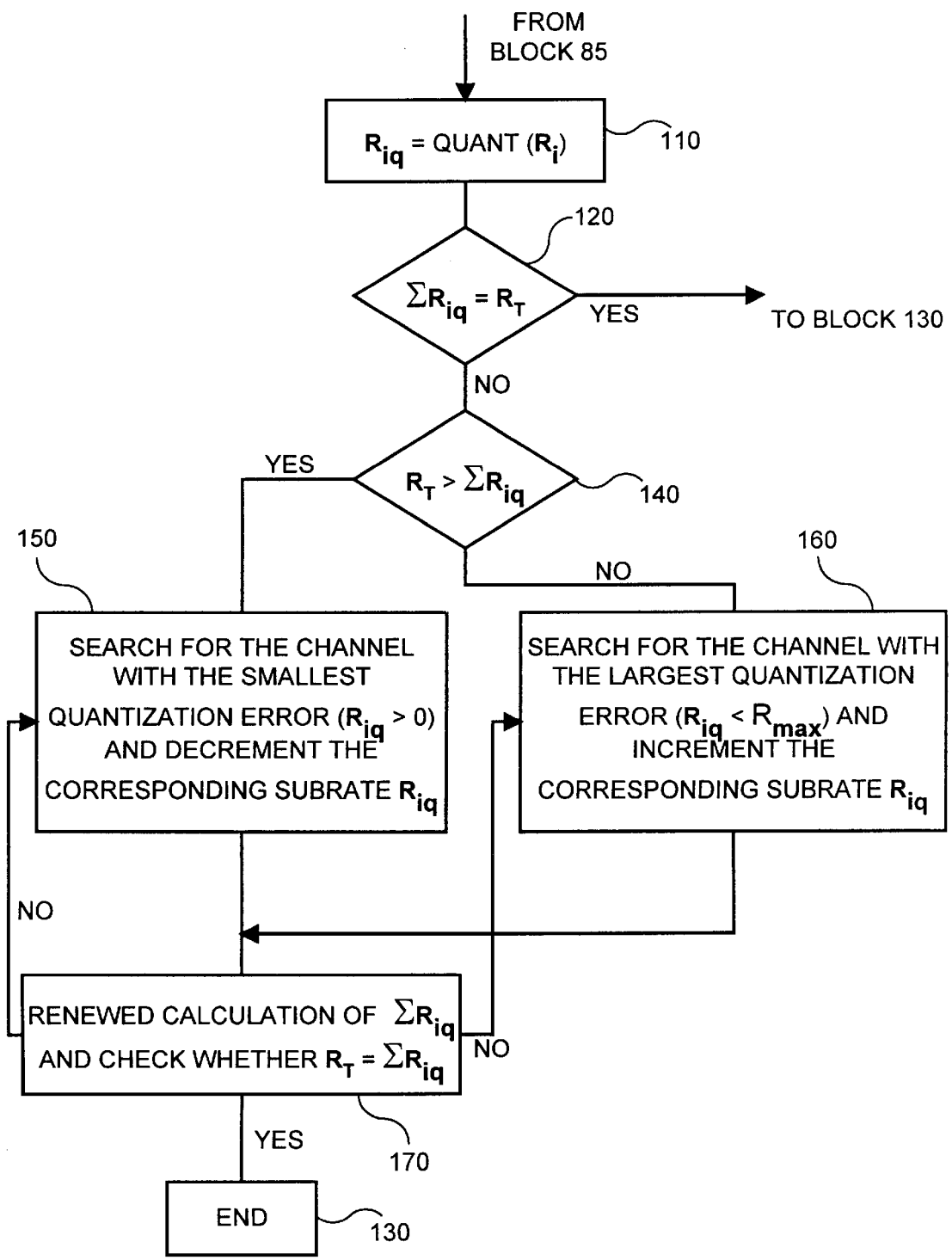

The process in accordance with the invention for distributing the aggregate rate $R_T$ and the total transmitting power $S_T$ of a data stream over a plurality of channels of one channel group of a predefined size can best be followed on the basis of FIG. 1. The flow chart illustrated in FIGS. 1A and 1B shows a possibility for optimally distributing the aggregate rate $R_T$ of a data stream over an appropriate number of suitable channels. It is assumed here that the signal points for which the minimal quadratic Euclidean distance (relative to the average noise power) is to be maximized come from a QAM symbol set, for example. The aim of the process is to find, from a group of D channels, those channels over which the aggregate rate $R_T$ of a data stream to be transmitted can be transmitted with a smallest possible bit error probability. In the first step, which is depicted in FIG. 1 by blocks, 10, 20, 30 and 40, the noise variance, also referred to as average noise power $N_i$, is initially calculated in each of the D channels. Above and beyond that, of course, the aggregate rate $R_T$ of the data stream to be transmitted, as well as the maximum sub-rate $R_{max}$, which is fixed on the basis of practical considerations, are known. Before the individual sub-rates are calculated, the logarithm of the average noise power is first calculated for each of the D channels and stored. In this manner, the computational burden can be considerably reduced, since after that it is merely necessary to perform simple addition and division steps. The initialization step illustrated in blocks 10, 20, 30 and 40 is concluded in that the number D' of channels used is initially set to D, as shown in block 40. In the next step, which is represented by block 50, a loop variable i, which assumes values from 0 to D', is initially set to zero. A cumulative variable $\Delta D$, which counts all of those channels whose sub-rates calculated in accordance with equation (2) are less than or equal to zero, is likewise initially set to equal zero. The process for calculating the sub-rates for each channel i enters in block 55 into a loop which is cycled through until the sub-rates have been calculated for all D' channels. Thus, the first cycle comprises exactly D loop iterations. If the query in block 55 reveals that i is equal to D', i.e., that the sub-rates of all D' channels have been calculated, the process branches to block 85. However, let it be assumed here first that the decision is affirmative in block 55. Accordingly, the sub-rate for the active channel is calculated in block 60 in accordance with equation (2). The query follows in decision block 65 whether the calculated sub-rate is smaller than or equal to zero. If the calculated sub-rate is greater than zero, the process immediately branches to block 80, where the loop variable is incremented by 1, and subsequently enters at block 55 into the next loop repetition. If, on the other hand, the response in block 65 is affirmative, the active channel is taken out and is no longer considered, as indicated in block 70. The cumulative variable $\Delta D$ and the loop variable i are subsequently incremented by 1. After the sub-rates of all D channels have been calculated in the first cycle, the process branches, as already mentioned, to block 85. It is determined in block 85 whether at least one channel has been calculated with a sub-rate less than or equal to zero. If a sub-rate less than or equal to zero is calculated, then the process branches to block 90, in which the number D' is reduced by the cumulative variable $\Delta D$ accumulated in block 75 during the first cycle. The second cycle, which now comprises D'=D'−$\Delta D$ loop iterations is continued in block 50 with the newly calculated value D'. Cycles are run through as many times as required, each time with a reduced loop number, until only channels with positive sub-rates remain. In this case, at the end of the last cycle, the cumulative variable $\Delta D$ is equal to zero, and the process branches in block 85 to block 110. In block 110, all positive sub-rates are quantized or rounded, the rounding errors are determined and stored. The quantization characteristic QUANT $(R_{iq})$ is expressed in this case by the equation $$QUANT(R_i) = \begin{cases} R_{max}, & R_i \geq R_{max} - 0,5 \\ \text{Integ}(R_i + 0,5), & 0,5 \leq R_i < R_{max} - 0,5 \\ 0, & R_i < 0,5 \end{cases}$$

The sum of all rounded sub-rates is generated in decision block 120, and the decision is made whether the sum is equal to the aggregate rate $R_T$. If the sum corresponds to the aggregate rate $R_T$, the process is ended in block 130. The total transmitting power can now be distributed over the determined D' channels such that the same bit error rate results in each channel. Therefore, the result is a number D' of channels used, over which the aggregate rate $R_T$ of the data stream to be transmitted can be optimally distributed and, in fact, based on the minimal quadratic Euclidean distance (relative to the average noise power) between two signal points, which can be represented, for example, in a QAM diagram. If the decision in block 120 reveals that the sum is not equal to the aggregate rate $R_T$, another query follows in block 140 whether the sum of all sub-rates is greater than the aggregate rate. If the answer is affirmative, the sub-rate of that channel for which the smallest quantization error has been calculated is lowered in block 150. Step 150 is performed until the aggregate rate $R_T$ is reached (see block 170). The process is subsequently ended in block 130. If the query in decision block 140 reveals that the sum is smaller than the aggregate rate $R_T$, the sub-rate of the channel having the largest quantization error is incremented. This step is repeated in block 160 until the aggregate rate $R_T$ is reached. After that, the process is likewise ended. The process in accordance with the invention is concluded in that the overall transmitting capacity is distributed over the actually used D' channels so that the same bit error rate results in each channel.

Thus, the process in accordance with the invention not only improves channel optimization, but implicitly improves band width optimization as well, since only the previously calculated, used channels occupy the frequency band. Moreover, the process is distinguished by a definite reduction in computational complexity. Since only the logarithms of the average noise powers are needed to calculate the aggregate rate, in contrast to the Chow et al. algorithm, merely D logarithm operations arise. Therefore, simple addition and division steps are all that need to be performed during the iteration. The need for exponentiation with real exponents is entirely eliminated.

In FIG. 2, the average quadratic distance from the decision threshold (on a logarithmic scale) relative to the noise variance $(SNR_o)$ over the cable length (l) in accordance with the invention is plotted in comparison to the corresponding results in accordance with the Chow et al. process. The curves are recorded for a 2.048 mbit/s transmission over symmetric lines having a conductor diameter of 0.4 mm. An aggregate rate $R_T$ of 1024 bit/symbol was distributed over 256 sub-channels. FIG. 2 illustrates the attainable signal-to-noise ratio, which is an index of noise immunity. The maximum sub-rate $R_{max}$, which has been set to 6, 10, or infinity, is given as a parameter. The solid-line curves were determined in accordance with the process of the invention, and the broken-line curves in accordance with the known Chow et al. process. A comparison of the illustrated curves reveals that the process according to the invention is superior or at least comparable in all areas to the Chow et al. method. It should be emphasized once more that the results attained with the process according to the invention are clearly better, at the least, however, comparable to the Chow process and, at the same time, substantially reduce the required computational complexity.

What is claimed is:

1. A method for distributing an aggregate rate ($R_T$) and a total transmitting power ($S_T$) of a data stream over a plurality of channels of a channel group of a predefined size (D) comprising the steps of:

determining an average noise power ($N_i$) in each of the plurality of channels;

calculating a sub-rate ($R_i$) capable of being transmitted over one of the plurality of channels, where $$R_i = \frac{R_T}{D'} + \frac{1}{D'} ld\left(\frac{\prod_{l=1}^{D'} N_l}{N_i^{D'}}\right) \quad (1)$$

$R_i$ being the sub-rate in the I-th channel, $N_i$ the average noise power in the I-th channel, and D' the number of actually used channels of the plurality of channels;

removing channels whose calculated sub-rates are less than or equal to zero;

rounding the sub-rates of the channels remaining after the step of removing to integer values ($R_{iq}$) so that $\Sigma R_{iq} = R_T$; and distributing the overall transmitting capacity $S_T$ over the remaining channels so as to achieve the same bit error rate in each channel.

2. The method as recited in claim 1 wherein the steps of calculating and removing are repeated iteratively until all sub-rates are positive, with the number D' initially being set to D and reduced in each subsequent iteration step by the number of removed channels.

3. The method as recited in claim 1 wherein the step of rounding comprises:

rounding up or off each sub-rate of the remaining channels to an integer value ($R_{iq}$) and determining and storing a corresponding difference $\Delta R_i = R_i - R_{iq}$;

summing the rounded sub-rates ($\Sigma R_{iq}$); and when $\Sigma R_{iq} > R_T$, decrementing the sub-rate of the channel for which $\Delta R_i$ is minimal and repeating the decrementing until the aggregate rate $R_T$ is reached;

when $\Sigma R_{iq} < R_T$, incrementing the sub-rate of the channel for which $\Delta R_i$ is maximum and repeating the incrementing until the aggregate rate $R_T$ is reached.

4. The method as recited in claim 1 wherein a logarithm of the average noise power for each channel is precalculated for form precalculated logarithms, and the sub-rates are then calculated as a function of the precalculated logarithms using simple addition and division steps.

5. The method as recited in claim 1 wherein the calculated sub-rates which are greater than a predefined maximum sub-rate value ($R_{max}$) are set to the predefined maximum sub-rate value ($R_{max}$).

6. A method for distributing a data stream having an aggregate rate $R_T$ over a plurality of channels, the method comprising the steps of:

calculating a sub-rate ($R_i$) capable of being transmitted over one of the plurality of channels, where $$R_i = \frac{R_T}{D'} + \frac{1}{D'} ld\left(\frac{\prod_{l=1}^{D'} N_l}{N_i^{D'}}\right) \quad (1)$$

$R_i$ being the sub-rate in the i-th channel, $N_i$ an average noise power in the i-th channel, and D' the number of actually used channels of the plurality of channels; and distributing the data stream over the plurality of channels so as to effect a similar bit error rate.

7. The method as recited in claim 6 wherein the calculating step includes precalculating a logarithm of the average noise power for each channel.

* * * * *